United States Patent

Hanlon

[11] Patent Number: 5,873,575
[45] Date of Patent: Feb. 23, 1999

[54] FLUID COOLED PACKING CASE MEMBER FOR COMPRESSORS AND OTHER MACHINERY

[75] Inventor: Paul C. Hanlon, Shepherdsville, Ky.

[73] Assignee: Delaware Capital Formation, Inc., Wilmington, Del.

[21] Appl. No.: 840,479

[22] Filed: Apr. 21, 1997

[51] Int. Cl.$^6$ .................................................. F16J 15/26
[52] U.S. Cl. ...................... 277/512; 277/514; 277/517; 277/518; 165/89; 165/90; 165/154; 165/163
[58] Field of Search .................................... 277/512, 514, 277/517, 518, 519, 930, 430, 431, 367; 165/89, 90, 154, 165, 163

[56] References Cited

U.S. PATENT DOCUMENTS

| | | | |
|---|---|---|---|
| 830,248 | 9/1906 | Von Orth | 165/154 |
| 3,048,411 | 8/1962 | Waibel | 277/512 |
| 3,357,706 | 12/1967 | Wilkinson | 277/930 X |
| 3,544,118 | 12/1970 | Klein | 277/514 X |
| 4,305,592 | 12/1981 | Peterson | 277/59 |
| 4,545,585 | 10/1985 | Buse | 277/22 |
| 4,554,969 | 11/1985 | Carnavos | 165/154 |
| 4,560,173 | 12/1985 | Adams et al. | 277/15 |
| 4,630,669 | 12/1986 | Kessler et al. | 165/1 |
| 4,872,689 | 10/1989 | Drumm | 277/9.5 |
| 5,035,436 | 7/1991 | Rockwood et al. | 277/25 |
| 5,144,882 | 9/1992 | Weissgerber | 92/87 |
| 5,171,023 | 12/1992 | Scott et al. | 277/3 |
| 5,263,404 | 11/1993 | Gaucher et al. | 92/168 |
| 5,484,267 | 1/1996 | Rockwood | 417/53 |
| 5,533,738 | 7/1996 | Hoffmann | 277/27 |
| 5,540,448 | 7/1996 | Heinzen | 277/2 |
| 5,540,449 | 7/1996 | Algers et al. | 277/65 |

Primary Examiner—Anthony Knight
Assistant Examiner—John R. Cottingham
Attorney, Agent, or Firm—Maurice L. Miller, Jr.

[57] ABSTRACT

A packing case member or packing cup for use in a package of other similar cups for mounting on a reciprocally or rotatably movable machinery shaft to prevent gas leakage along the shaft is disclosed. The member includes a circular central opening for the shaft and provision for a conventional seal ring which slidably bears against the shaft as the shaft moves through the member. A fluid coolant passageway is formed in the member so as to extend around a majority peripheral portion of the central opening between inlet and outlet ports located at opposite end portions of the passageway. The passageway is characterized by at least three straight line segments which successively intersect one another at various angular positions around the central opening. Each straight line segment is accessible through a peripheral access opening which communicates with one end thereof for ease of cleaning debris clogging the passageway. In one embodiment, separate threaded plugs removably seal the access openings to prevent coolant leakage. In another embodiment, a circular band removably mounted over the peripheral edge of the member encloses the access openings and a pair of O-rings are confined around the periphery of the member under the band on opposite sides of the access openings to prevent coolant leakage between the periphery and the band.

15 Claims, 3 Drawing Sheets

FLUID COOLED PACKING CASE MEMBER FOR COMPRESSORS AND OTHER MACHINERY

BACKGROUND OF THE INVENTION

This invention relates generally to improvements in packing case members and more specifically to improvements in the coolant circulation structure of such members.

Broadly speaking, packing case structures have long been used in the prior art to provide a seal along and around a reciprocally movable piston rod of a gas compressor to prevent the escape of gas from the piston cylinder along and around the surface of the piston rod. Such packing case structures have also been used in the prior art to provide gas tight seals along and around the movable shafts of rotating machinery. Typically, a prior art packing case member or packing cup is cylindrically shaped and contains a central circular opening for stationary mounting in a compressor housing on a reciprocally movable piston rod. The central opening is of somewhat greater diameter than that of the piston rod so that the peripheral defining wall of central opening is spaced from the surface of the piston rod so that the latter does not rub against the cup as the piston rod reciprocates in the central opening. But since this spacing can allow gases being compressed by the piston to escape the compression chamber along and around the surface of the rod, the series of cups making up the packing case contains seal rings which slidably bear against the rod to provide a gas tight barrier.

The seal rings cause sliding friction to occur along the piston rod as the latter reciprocates through the former, which friction causes heating of the packing cups. While a liquid lubricant is typically introduced through a passageway in the packing case to the surface of the piston rod to reduce such sliding friction, enough friction usually remains to cause serious heating of the packing cups. To deal with this problem in the prior art, the cylindrically shaped cups are typically cast in two mating cylindrically shaped pieces. A circular groove is machined into opposing surface portions of the mating faces of the pieces so that, when they are joined, a circular passageway is formed in the cup housing which extends around a majority peripheral portion of the central opening. One end of the passageway contains an inlet port which opens onto one flat face of the cup, while the opposite end portion of the passageway contains an outlet port which opens onto an opposite flat face of the cup. A fluid coolant introduced into the circular passageway flows between the inlet and outlet ports to absorb heat from the cup housing.

Typically, a single inlet line carrying liquid coolant is connected to each inlet port in the series of cups making up a packing case. Similarly, a single outlet line collects the coolant circulated through each cup and is connected to each of the outlet ports of each of the cups. This arrangement is called parallel flow and has the disadvantage that the passageways of one or more cups can become clogged with incrustation or debris to produce increased heating in the clogged cup or cups without it becoming immediately apparent to operators of the compressor.

Another problem encountered with these prior art packing cups is that, because they are formed of two mated pieces, it is necessary to completely remove them from the piston rod and break them apart in order to clean the individual grooves forming the circular coolant passageways. A further problem results from having to form concentrically spaced apart annularly extending grooves in at least one of the mating pieces of housing, which grooves extend around opposite sides of the coolant passageway and in which a pair of O-rings can be placed to be confined between the mating surfaces of the pieces. This is necessary to inhibit coolant from leaking from the passageway between the mating pieces and out of the packing cup. But the O-rings and their grooves take up valuable space in the cup and thus limit the cross-sectional area of the coolant passageway and thus limit the volume of coolant that can be circulated through the cup per unit of time. This in turn, limits the ability of the coolant to absorb heat from the packing cup. It would therefore be desirable to provide means for eliminating the two piece construction of the prior art packing cup so that the O-rings could be eliminated to make room for a coolant passageway of larger cross-sectional area.

By means of my invention, these and other difficulties encountered using prior art packing case members or cups is substantially eliminated.

SUMMARY OF THE INVENTION

It is an object of the present invention to provide an improved packing case member for mounting on a machinery shaft which is movable relative to the member.

It is a further object of the present invention to provide a packing case member which includes a housing defining a hollow coolant passageway comprising a series of hollow intersecting straight line segments wherein each of the segments contains at least one access opening located on at least one outer surface of the housing.

It is also an object of my invention to provide a packing case for a movable machinery shaft or rod containing a series of packing case members having separate coolant passageways therein which can be successively linked together to form a series flow path for coolant circulating through the packing case.

Briefly, in accordance with the present invention, there is provided a packing case member for mounting on a machinery shaft, which shaft is movable relative to the member. The member includes a housing defining a circular opening therethrough for insertion of a movable machinery shaft therein. The housing also defines a hollow passageway surrounding a majority peripheral portion of the central opening to form a path for the flow of a fluid coolant substantially completely around the circular opening between a fluid inlet port and a fluid outlet port located on opposite end portions of said passageway. The inlet port and outer port open onto at least one outer surface of said housing. The passageway is formed by a series of hollow, straight-line segments successively intersecting one another at different angular positions around the circular opening between the inlet port and said outlet port. Each of the straight-line segments includes an end portion extending to a different access opening located on at least one outer surface of the housing. The member also includes means for selectively sealing each access opening to prevent leakage of fluid coolant therethrough.

These and other objects, features and advantages of the present invention will become apparent to those skilled in the art from the following detailed description and attached drawings, upon which, by way of example, only the preferred embodiments of the present invention are explained and illustrated.

DESCRIPTION OF THE PREFERRED EMBODIMENTS

Figure 2:
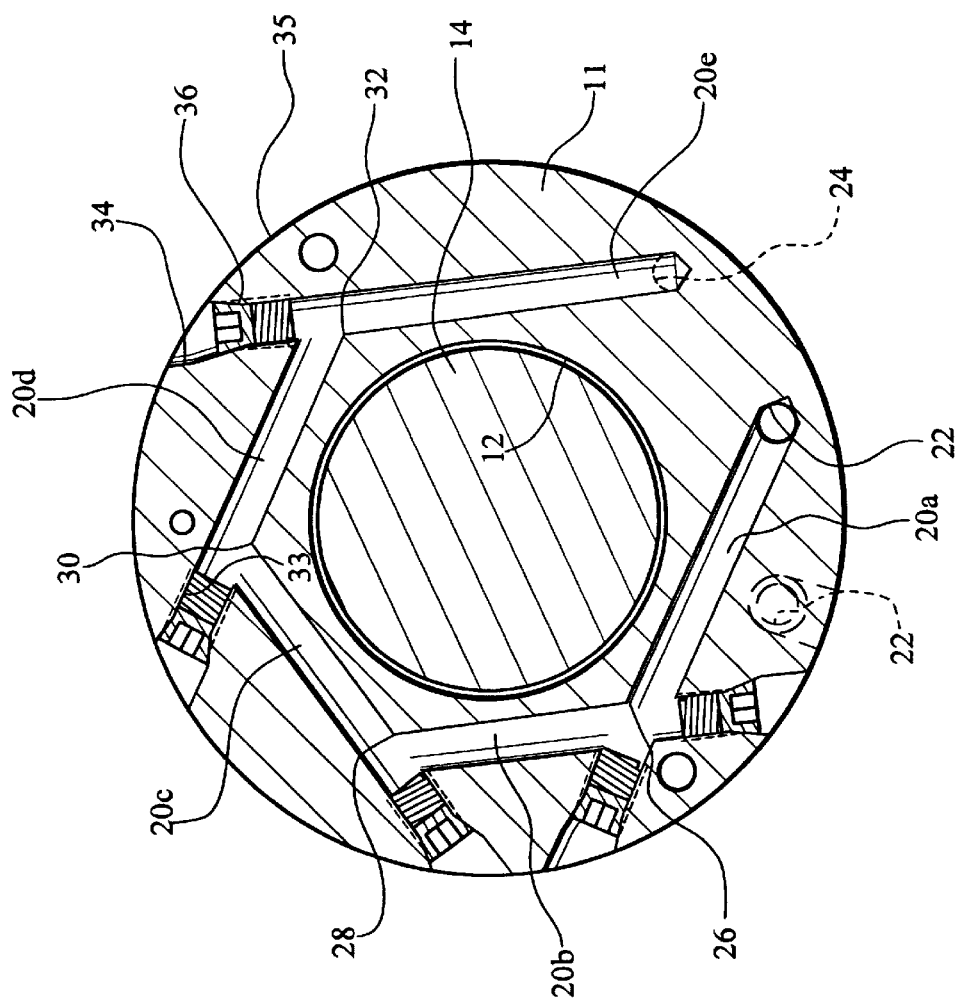
FIG. 2 shows a cross-sectional view of the cup and piston rod of FIG. 1 as viewed along cross-section lines 2—2 of the latter mentioned figure, with missing parts of the latter mentioned figure being replaced.
Figure 1:
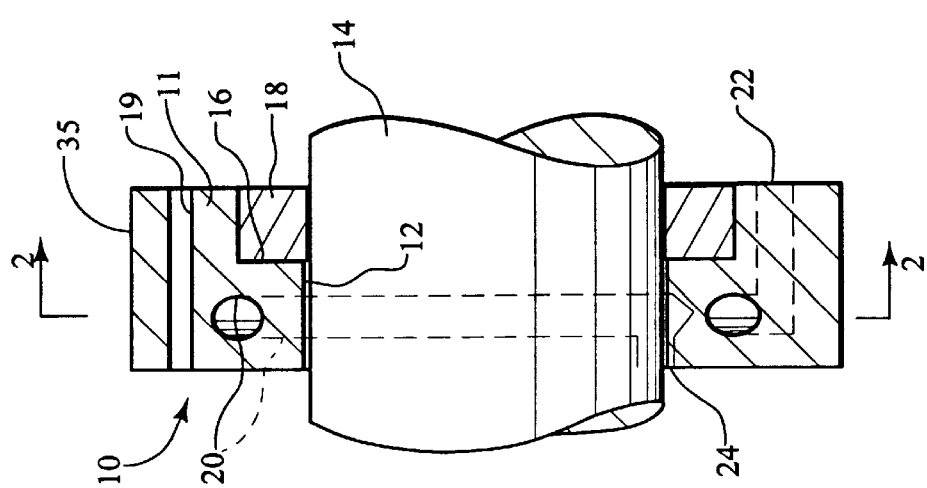
FIG. 1 shows a fragmented peripheral edge view of a novel packing cup disposed on a piston rod of a conventional compressor, thus illustrating a preferred embodiment of the present invention.
Figure 3:
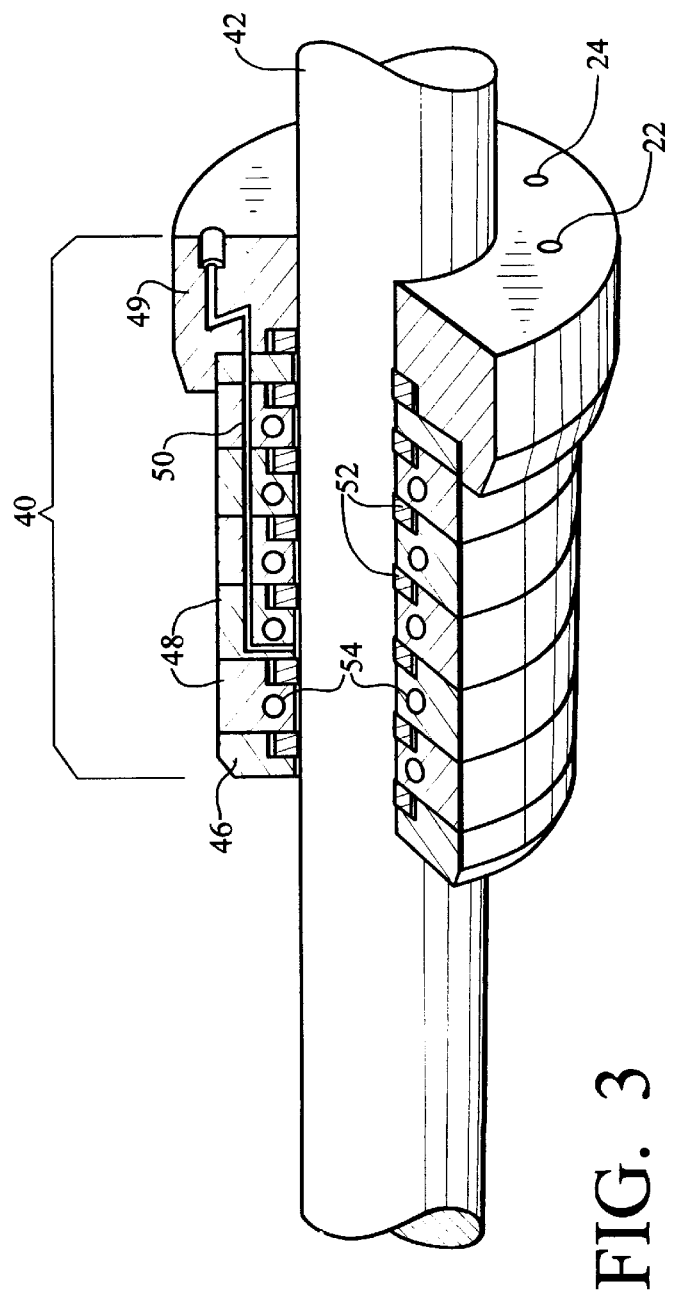
FIG. 3 shows a perspective view of a fragmented packing case containing a series of packing cups of the type shown in FIGS. 1–2, with the series of cups being operatively disposed between a pair of conventional end cups on a compressor piston rod.

Referring now to the drawing figures and, in particular, to FIGS. 1–2, there is shown, in a preferred embodiment of my invention, a novel packing cup, generally designated 10, preferably for use with other similar cups in a packing case (such as shown in FIG. 3). The cup 10 can be constructed of steel, cast iron, bronze or other suitable materials with the usual attention being paid to chemical resistance and mechanical strength requirements for a particular application. The cup 10 of the present example includes a disc or annularly shaped housing 11 and contains a circular central opening 12 which permits it to be loosely and concentrically mounted on a movable machinery shaft 14, such as either a rotating shaft or a reciprocally movable piston rod of a conventional compressor. The diameter of the opening 12 should be sufficiently greater than that of the shaft 14 so that the periphery of the opening is spaced from and does not rub against the shaft 14 as the latter rotates or reciprocates in or through the opening as the case may be.

The cup 10, and the packing case of which it is a part, is then stationarily mounted so that the movable shaft 14 is free to reciprocate back and forth or rotate without touching the peripheral defining wall of the opening 12. An annularly extending notch 16 of L-shaped cross-section (FIG. 1) is formed in and around a surface portion of one end of the cup 10 in which a conventional seal ring 18 is placed. The seal ring 18 thus rubs against the rod or shaft 14 as the latter moves and forms a seal to prevent gases from escaping along the rod or shaft through the spaced apart opening 12 of the cup 10. Typically, the seal ring 18 can be constructed from a wide variety of different materials such as, for example, bronze, cast iron, or various plastics or metal alloys. As is conventional, a passageway 19 can be drilled through the body of the housing 11 to provide a path for lubricating fluid to lubricate the surface of the rod or shaft 14 against which the seal ring 18 bears as will be more fully appreciated later herein in reference to FIG. 3.

A novel feature of the cup 10 relates to the geometry of a hollow passageway 20 formed in the housing 11 which surrounds a majority peripheral portion of the opening 12 to form a path for the flow of a fluid coolant substantially completely around the opening 12 between a fluid inlet port 22 and a fluid outlet port 24. The inlet and outlet ports 22, 24 are located on opposite end portions of the passageway 20 and, in the present example, open outwardly onto opposite flat faces of the housing 11. The passageway 20 is, preferably, circular in cross-section and, in the present example, is formed by a series of five hollow, straight line segments 20a, 20b, 20c, 20d and 20e (See FIG. 2) which successively intersect one another at different angular positions, as at 26, 28, 30 and 32, around the opening 12 between the inlet and outlet ports 22 and 24. The fluid coolant circulating through the passageway 20 absorbs heat from the body of the housing 11 caused by the shaft 14 as it rubs against the seal ring 18.

Each of the straight line segments 20a–e includes an end portion which extends to a different access opening 34 located on an outer peripheral surface 35 of the housing 11. Each of the access openings 34 contains a suitable means for selectively or removably sealing the opening to prevent leakage of a fluid coolant from the passageway 20 therethrough. Such means includes any suitable type of plug. In the present example, I prefer to tap or thread an end portion 33 of each segment 20a–e joining the corresponding access opening 34 for insertion of a conformingly threaded plug 36 therein. I also prefer to provide a head on the threaded plug 36 which can accommodate an Allen wrench for threadable insertion and removal of the plug into and from the access opening 34 and end portion 33 as desired. An alternative sealing means for such access openings 34 will be explained later herein.

The use of intersecting straight line segments to form the passageway 20 with access to at least one end of each of the segments through one of the access openings 34 located on the periphery of the housing 11 is advantageous for several reasons. First, such an arrangement readily permits cleaning of each of the straight line segments of incrustation or debris as, for example, by use of a conventional drill inserted into each segment 20a–e through its corresponding access opening 34. Second, the intersecting straight line segments can be readily formed in the unitary housing 11 by simply drilling the segments along selected cords of the circular periphery of the housing. Third, since the housing 11 may be of one piece, unitary construction, rather than being formed of two mating pieces, as is true of prior art packing cups wherein a circular passageway is formed around the central opening as by machining the same, there is no need to use O-rings between adjoining portions of housing on opposite sides of the passageway to prevent leakage of liquid coolant from between the mated portions. Because the need for such O-rings is eliminated with the elimination of mating portions of the housing in favor of a unitary housing, the crosssectional area of the passageway segments drilled in the housing 11 can be greater than would otherwise be possible. This, in turn, permits a greater volume of liquid coolant to flow through the passageway 20 of the cup 10 per unit of time for greater heat transfer than has been possible using prior art packing cups having housings consisting of two mated pieces and a pair of O-rings. Fourth, because of the abrupt changes in direction of the passageway 20 at the intersections 26, 28, 30 and 32, coolant circulating through the passageway is turbulent in the region of these junctions rather than laminar, the latter type flow being the case in conventional circular coolant flow passageways, resulting in greater heat transfer from the body of the housing 11 to the circulating coolant than has been obtainable using prior art packing cups with conventional circular passageways.

Referring now to FIG. 3, there is shown a complete packing case assembly 40 for use on a piston rod 42 of a conventional compressor. The assembly 40 includes an end cup 46, a series of five packing cups 48 and a flange 49, each of which is identical to the cup 10. As is also conventional, several of the packing cups 48 may have a passageway 50 formed therein for the purpose of delivering a lubricant, such as oil, to the surface of the piston rod 42 to reduce sliding friction between a series of conventional seal rings 52 and the surface of the rod. The passageway 19 of the cup 10 of FIGS. 1–2 could form a portion of the passageway 50 when included in the assembly 40. The number of packing cups 48 contained in any given packing case is a matter of conventional design choice.

Figure 4:
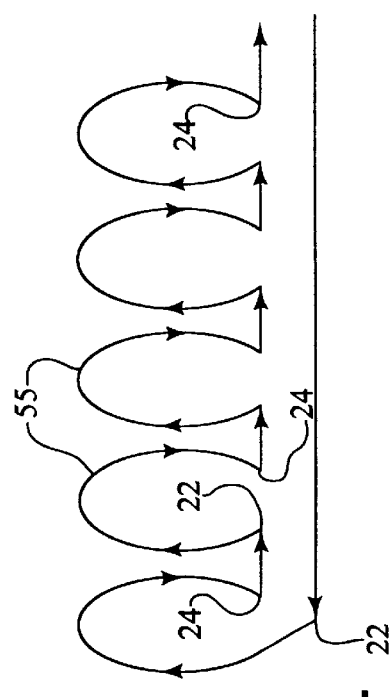
FIG. 4 shows, schematically, a series or tandem flow arrangement for a liquid coolant circulated through the series of packing cups of FIG. 3.

Another important feature of the present invention is the series or tandem coolant flow arrangement of the coolant passageways 54 of each of the packing cups 48. FIG. 4 shows, schematically, such a series coolant flow arrangement between each of the cups 48 from the inlet port 22 of a first upstream one of such cups, thence successively through each of the five cups, as represented by arrowed loops 55, to the outlet port 24 of the last downstream one of the cups. Such a series flow arrangement allows for a greater velocity of coolant flow through each of the cups 48 than would be the case if the passageways of the individual cups were instead, linked in a conventional parallel flow arrangement. The series coolant flow arrangement of FIG. 4 is thus advantageous as compared to the conventional parallel coolant flow arrangement used in prior art packing cups, regardless of the geometry of the passageways of the individual cups. The coolant passageways 20 of a series of packing cups of my invention can, of course, be joined in either the conventional parallel flow arrangement of the prior art or in the presently illustrated series flow arrangement as desired.

Figures 5, 6:
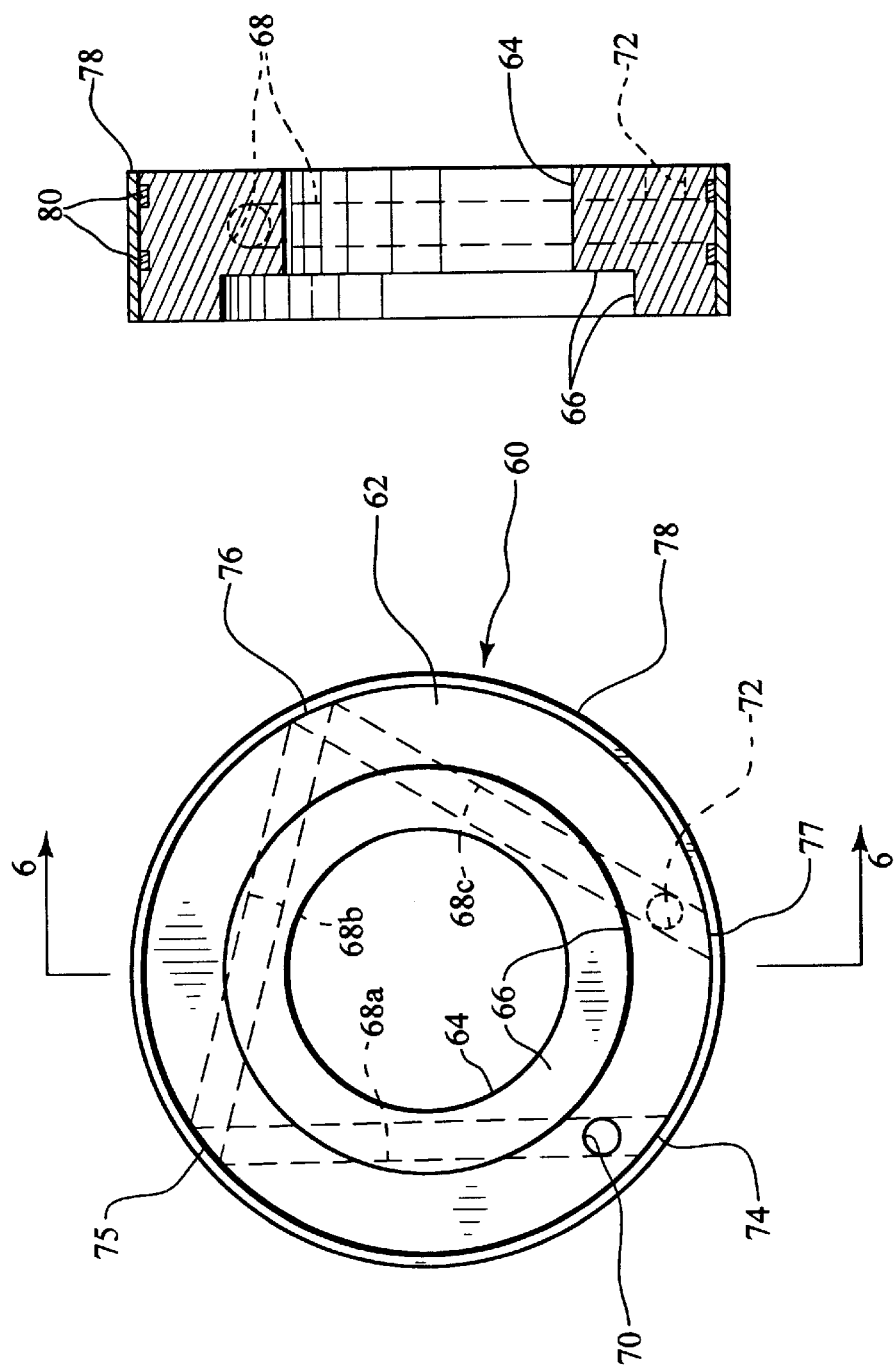
FIG. 5 shows a plan view of an alternative embodiment of the packing cup of the present invention.
FIG. 6 shows a cross-sectional view of the packing cup of FIG. 5 as viewed along cross-section lines 6—6 of the latter mentioned figure.

Referring now to FIGS. 5–6 there is shown, in an alternative embodiment of my invention, an individual packing cup, generally designated 60, which, as in the example of the cup 10, also includes an annularly shaped housing 62 defining a circular central opening 64 for insertion of a movable rod or shaft in close conforming but spaced apart relation therein and an annularly extending notch 66 of L-shaped cross-section for confining a conventional seal ring, not shown, therein. In this example, however, a hollow coolant passageway 68 (See FIG. 6) is formed therein which contains only three straight line segments 68a, 68b and 68c as shown in FIG. 5. The three passageways 68a–c intersect one another successively between a coolant inlet port 70 and a coolant outlet port 72. The inlet port 70 opens onto one flat face of the cup 60 and the outlet port 72 opens onto an opposite flat face of the cup.

The segments 68a–c form three different cords of the circular periphery of the housing 62 and each of the segments opens on opposite ends thereof on the circular peripheral edge of the housing as at 74, 75, 76 and 77. Note that the downstream end of the segment 68a contains a peripheral access opening 75 which it shares with the upstream end of the segment 68b. Similarly, the downstream end of the segment 68b shares the same peripheral access opening 76 with the upstream end of the segment 68c. Finally, the upstream end of the segment 68a opens onto the periphery of the housing 62 in front of the inlet port 70 while the downstream end of the segment 68c opens onto the periphery of the housing at 77 behind the outlet port 72.

A thin circular band 78, preferably constructed of steel, slides tightly over and around the peripheral edge of the housing 62 to provide an alternative means for selectively or removably sealing the access openings 74–77 of the passageway segments 68a–c. To assure that liquid coolant does not leak from the passageway 68, thence through the one or more of the access openings 74–77 and across the peripheral edge of the housing 62 beneath the band 78, a pair of O-rings 80 are confined in annularly extending, outwardly opening grooves formed in opposite peripheral edge portions of the housing 62 against opposite edge portions of the band 78. The access openings 74–77 are thus disposed between the O-rings 80 and their corresponding grooves. An advantage gained by using of the circular band 78 as a means for sealing the access openings 74–77 instead of the plugs 36 of FIGS. 1–2, is that it is not necessary to tap end portions of the segments 68a–c for use with threaded plugs. The band 78 can be forced off of the peripheral edge of the housing 62 to expose the access openings 74–77 when necessary. Such an advantage must be weighted against the disadvantage of having to limit the cross-sectional area of the passageway 68 because of the space taken up on opposite sides of the access openings 74–77 by the O-rings 80 and their corresponding grooves.

It will be appreciated that various modifications of the examples shown and described herein can be made without departing from the scope of the invention. For example, the outer surface of the packing cups 10 and 60 need not necessarily be circular, although such construction is preferred. They could, for example, be rectangularly shaped or, otherwise, form some other polygonal shape. Also, the coolant passageways 20 of FIGS. 1–2, and 68 of FIGS. 5–6 could be machined in the form of two open grooves in two mating pieces of housing, rather than being drilled in a unitary housing, although such construction presents the disadvantage of having to use space consuming O-rings between the mating pieces on either side of the resulting passageway as previously explained. Furthermore, the number of intersecting straight line segments used to form the coolant passageway between corresponding inlet and outlet ports can be as few as three, as in FIGS. 5–6, or as many as practical, although a total of five, as in FIGS. 1–2, is preferred as being both adequate and practical.

Although the present invention has been explained with respect to specific details of certain preferred embodiments thereof, it is not intended that such details limit the scope and coverage of this patent other than as specifically set forth in the following claims.

I claim:

1. A packing case member for mounting on a machinery shaft which is movable relative to said member, said member comprising a housing defining a circular opening therethrough for insertion of a movable machinery shaft therein, said housing also defining a hollow passageway surrounding a majority peripheral portion of said central opening to form a path for the flow of a fluid coolant substantially completely around said circular opening between a fluid inlet port and a fluid outlet port located on opposite end portions of said passageway, which said inlet port and outlet port open onto at least one outer surface of said housing, said passageway being formed by a series of hollow, straight-line segments successively intersecting one another at different angular positions around said circular opening between said inlet port and said outlet port, each of said straight-line segments having an end portion extending to a different access opening located on at least one outer surface of said housing, and means for selectively sealing each said access opening to prevent leakage of a fluid coolant therethrough.

2. The member of claim 1 wherein said housing includes two oppositely facing, flat outer surfaces, each said port opening onto a different one of said flat surfaces.

3. The member of claim 1 wherein said housing includes a cylindrically shaped outer surface concentric with said circular opening, each said access opening being formed on said cylindrically shaped surface and being rotationally spaced apart around said cylindrically shaped surface.

4. The member of claim 1 wherein said series includes at least three straight-line segments.

5. The member of claim 1 wherein said series includes at least five straight-line segments.

6. The member of claim 1 wherein said sealing means includes a series of plugs equal in number to the number of said access openings, each of said plugs being removably disposed in a different one of said access openings.

7. The member of claim 1 wherein said housing is cylindrically shaped and wherein said access openings open in rotationally spaced apart relationships on and around a cylindrically shaped outer surface of said housing, said sealing means including a cylindrically shaped band, said band being removably press fit over said access openings, and a pair of seal rings removably disposed in a pair of outwardly opening grooves formed in and around an access opening containing outer surface portion of said housing on opposite sides of said access openings, said rings being pressed into a fluid sealing relationship between said band and said housing.

8. The member of claim 3 wherein said housing further includes a pair of oppositely facing flat surfaces, a surface portion of said member further defining an annularly shaped notch opening onto one of said flat outer surfaces around said central opening and opening radially inwardly toward and around a movable machine shaft when said shaft is inserted through said central opening, said member further comprising a seal ring disposed in said notch for slidably bearing against said shaft as said shaft moves relative to said member.

9. The member of claim 4 wherein a first one of said straight line segments communicates with said inlet port on an upstream end portion thereof, each of said straight line segments having a downstream end which intersects a next succeeding one of said straight line segments in said series at a position which is intermediate the ends of said next succeeding one of said segments except a last one of said segments which has a downstream end which is closed and a downstream end portion which communicates with said outlet port, each of said segments having an upstream end which communicates and is aligned with a different one of said access openings.

10. The member of claim 5 wherein a first one of said straight line segments contains said inlet port on an upstream end portion thereof, each of said straight line segments having a downstream end which intersects a next succeeding one of said straight line segments in said series at a position which is intermediate the ends of said next succeeding one of said segments except a last one of said segments which has a downstream end which is closed and a downstream end portion which communicates with said outlet port, each of said segments having an upstream end which communicates and is aligned with a different one of said access openings.

11. In a packing case adapted for mounting on a machinery shaft which is movable relative to said case, said case including a plurality of packing case members wherein each of said members comprises a housing defining a circular opening therethrough for insertion of a movable machinery shaft therein, said housing also defining a hollow passageway surrounding a majority peripheral portion of said central opening to form a path for the flow of a fluid coolant substantially completely around said circular opening between a fluid inlet port and a fluid outlet port located on opposite end portions of said passageway, said inlet port and said outlet port opening onto at least one outer surface of said housing, said passageway being formed by a series of hollow, straight-line segments successively intersecting one another at different angular positions around said circular opening between said inlet port and said outlet port, each of said straight-line segments having an end portion extending to a different access opening located on at least one outer surface of said housing, and means for removably sealing each said access opening to prevent leakage of a fluid coolant therethrough.

12. The packing case of claim 11 wherein the passageway of each of said members is series connected to the passageway of at least one other of said members such that a fluid coolant can be introduced into the inlet port of a first upstream member of said plurality so as to circulate successively through each said passageway between the inlet port and the outlet port of each of said plurality and thereafter exit the outlet port of a last downstream member of said plurality.

13. In a packing case adapted for mounting on a machinery shaft which is movable relative to said case, said case including a plurality of packing case members wherein each of said members comprises a housing defining a circular opening therethrough for insertion of a movable machinery shaft therein, said housing also defining a hollow passageway surrounding a majority peripheral portion of said central opening to form a path for the flow of a fluid coolant substantially completely around said circular opening between a fluid inlet port and a fluid outlet port located on opposite end portions of said passageway, said inlet port and said outlet port opening onto at least one outer surface of said housing, the passageway of each of said members being series connected to the passageway of at least one other of said members such that a fluid coolant can be introduced into the inlet port of a first upstream member of said plurality of packing case members so as to circulate successively through each said passageway between the inlet port and the outlet port of each of said plurality of packing case members and thereafter exit the outlet port of a last downstream member of said plurality of packing case members.

14. The packing case of claim 13 wherein said passageway comprises a plurality of hollow straight-line segments successively intersecting one another at different angular positions around said circular opening between said inlet port and said outlet port.

15. The packing case of claim 14 wherein each of said straight-line segments includes an end portion extending to a different access opening located on at least one outer surface of said housing, and means for selectively sealing each said access opening to prevent leakage of coolant therethrough and to permit access to said segment for cleaning the same.

* * * * *